(12) United States Patent
Hsieh

(10) Patent No.: US 7,320,544 B2
(45) Date of Patent: Jan. 22, 2008

(54) CONDUCTING STRUCTURE AND ELECTRONIC CLINICAL THERMOMETER EMBODYING THE STRUCTURE

(75) Inventor: Chih-Wei Hsieh, Chu Pei (TW)

(73) Assignee: Actherm, Inc., Hsinchu Hsien (TW)

( * ) Notice: Subject to any disclaimer, the term of this patent is extended or adjusted under 35 U.S.C. 154(b) by 0 days.

(21) Appl. No.: 11/286,327

(22) Filed: Nov. 25, 2005

(65) Prior Publication Data

US 2007/0014330 A1 Jan. 18, 2007

(30) Foreign Application Priority Data

Jul. 13, 2005 (TW) .............................. 94123671 A

(51) Int. Cl.
*G01K 1/00* (2006.01)
(52) U.S. Cl. ...................... 374/208; 374/163; 374/165; D10/57
(58) Field of Classification Search ................ 374/208, 374/163, 165; D10/57
See application file for complete search history.

(56) References Cited

U.S. PATENT DOCUMENTS

| | | | | |
|---|---|---|---|---|
| 5,133,606 A | * | 7/1992 | Zaragoza et al. ........... 374/208 |
| 6,676,290 B1 | * | 1/2004 | Lu .............................. 374/163 |
| 6,854,882 B2 | * | 2/2005 | Chen ........................... 374/208 |
| 6,962,438 B2 | * | 11/2005 | Chu ............................ 374/208 |
| 2003/0212339 A1 | * | 11/2003 | Lussier et al. .............. 600/549 |
| 2004/0071190 A1 | * | 4/2004 | Chang ......................... 374/185 |
| 2004/0105487 A1 | * | 6/2004 | Chen ........................... 374/163 |
| 2005/0047478 A1 | * | 3/2005 | Yu .............................. 374/163 |

* cited by examiner

*Primary Examiner*—Diego Gutierrez
*Assistant Examiner*—Megann Vaughn
(74) *Attorney, Agent, or Firm*—Leong C. Lei

(57) ABSTRACT

A conducting structure and an electronic clinical thermometer, wherein the conducting structure is provided on the measuring end of the clinical thermometer, and the measuring end has a recess, a temperature sensor and conducting wires fitted in the recess, and a contact member having a curved top and made of metallic conductive material and having a predetermined length embedded in the recess thereby providing the contact member with a large temperature sensing contact area but only with a small portion protruded out of the measuring end, and therefore enabling the thermometer to be fully in contact with a certain portion of the human body such as the armpit, preventing the thermometer from being broken, and achieving heat balance rapidly. The measuring end of the thermometer may be bent at a predetermined angle or the contact member may be arranged at either side of the measuring end as required.

7 Claims, 9 Drawing Sheets

CONDUCTING STRUCTURE AND ELECTRONIC CLINICAL THERMOMETER EMBODYING THE STRUCTURE

BACKGROUND OF THE INVENTION

1. Field of the Invention

This invention is related to a conducting structure and an electronic clinical thermometer embodying the structure, and in particular to a conducting structure which includes a contact member having a curved top and made of metallic conductive material and having a predetermined length embedded in a recess of a measuring end of the clinical thermometer thereby providing the contact member with a large temperature sensing contact area but only with a small portion protruded out of the measuring end, and therefore enabling the clinical thermometer to be in full contact with the human body, preventing the clinical thermometer from being broken, and achieving heat balance rapidly, wherein the measuring end of the clinical thermometer embodying the conducting structure may be bent at a predetermined angle or the contact member may be arranged at either side of the measuring end as required so as to achieve the effect of sensing and conducting in full contact.

2. Description of the Related Art

Before the invention of electronic thermometers, mercury thermometers were widely used for measuring body temperature. Mercury will expand when subject to heat and contract when subject to cold. When in measuring, the mercury in the measuring probe will expand so that the mercury will go into a capillary tube made of glass, so enabling a user to read the calibration on the exterior of the tube. In recent years, because of the serious danger of mercury pollution to human health, an electronic thermometer has been developed, and has gradually replaced the mercury thermometer.

The conventional electronic clinical thermometer includes a body portion, a temperature sensing circuit board mounted inside the body portion, a window for observing the reading provided on the surface of the body portion, a metal head enclosing the measuring end of the body portion, and a sensor fitted within the metal head and connected with the temperature sensing circuit board via conducting wires. However, since the metal head is fixedly fitted on the measuring end of the body portion with its surface almost completely exposed, the conventional electronic clinical thermometer suffers from the following drawbacks:

1. The metal head is easily broken and detached from the body portion;
2. The length of the metal head protruded from the body portion is larger than the length of the metal head embedded into the body portion thereby making it difficult to affix the metal head to the body portion according to the physical principle.
3. The metal head is an elongated cylindrical member so that the area of the top for sensing temperature is relatively small thereby making it impossible to provide a satisfactory heat balance effect.

Furthermore, the body portion of the conventional clinical thermometer does not have any angular variation in shape, so that it will be very inconvenient and the metal head cannot be in full contact with the human body when measuring the temperature of the armpit.

Therefore, it is object of the present invention to provide an improvement in the structure of an electronic clinical thermometer which can obviate and mitigate the above-mentioned drawbacks.

SUMMARY OF THE INVENTION

This invention is related to a conducting structure and an electronic clinical thermometer embodying the structure.

It is the primary object of the present invention to provide an a conducting structure of an electronic clinical thermometer which can be in full contact with the skin of a human body, wherein the measuring end has a recess, a temperature sensor and conducting wires fitted in the recess, and a contact member having a curved top and made of metallic conductive material and having a predetermined length embedded in the recess thereby providing the contact member with a large temperature sensing contact area but only with a small portion protruded out of the measuring end, and therefore enabling the thermometer to be fully in contact with the human body, preventing the thermometer from being broken, and achieving heat balance rapidly.

It is another object of the present invention to provide an electronic clinical thermometer which can be held easily and comfortably, wherein the measuring end of the thermometer may be bent at a predetermined angle or the contact member may be arranged at either side of the measuring end as required so as to achieve the effect of sensing and conducting in full contact with the human body.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
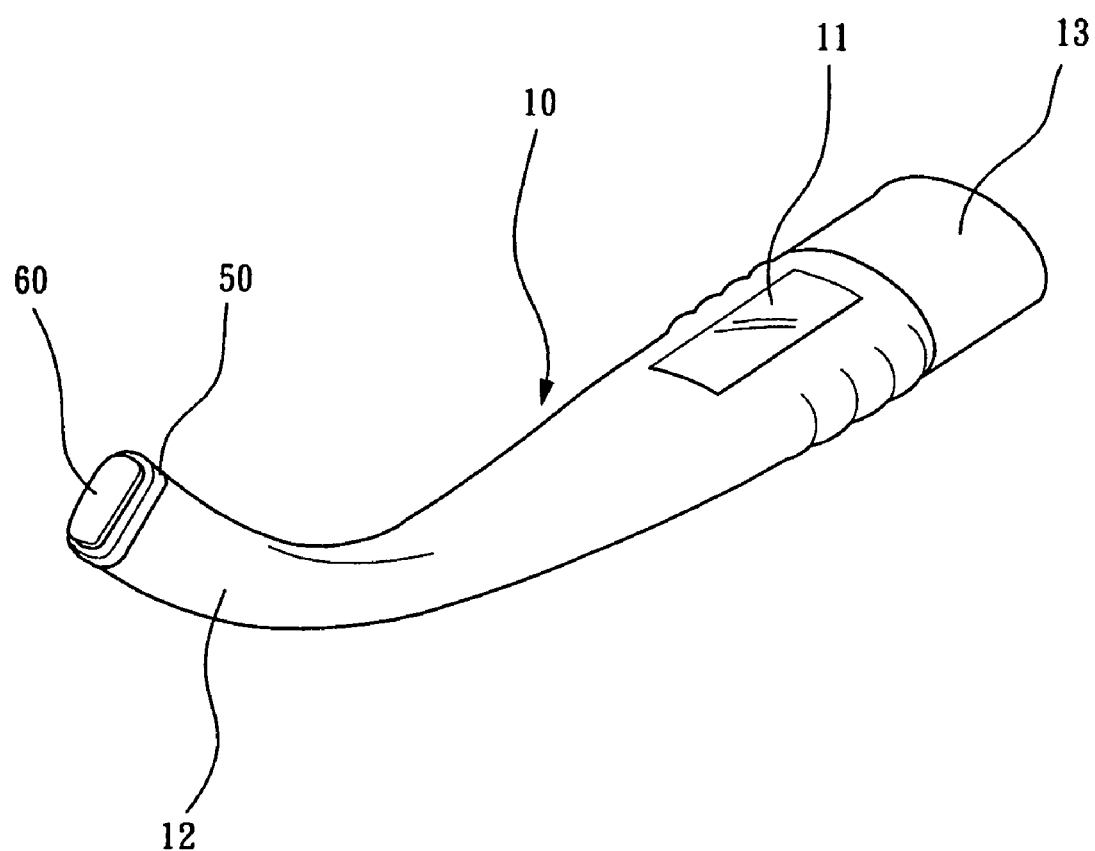
FIG. 1 is a perspective view of the present invention.
Figure 2:
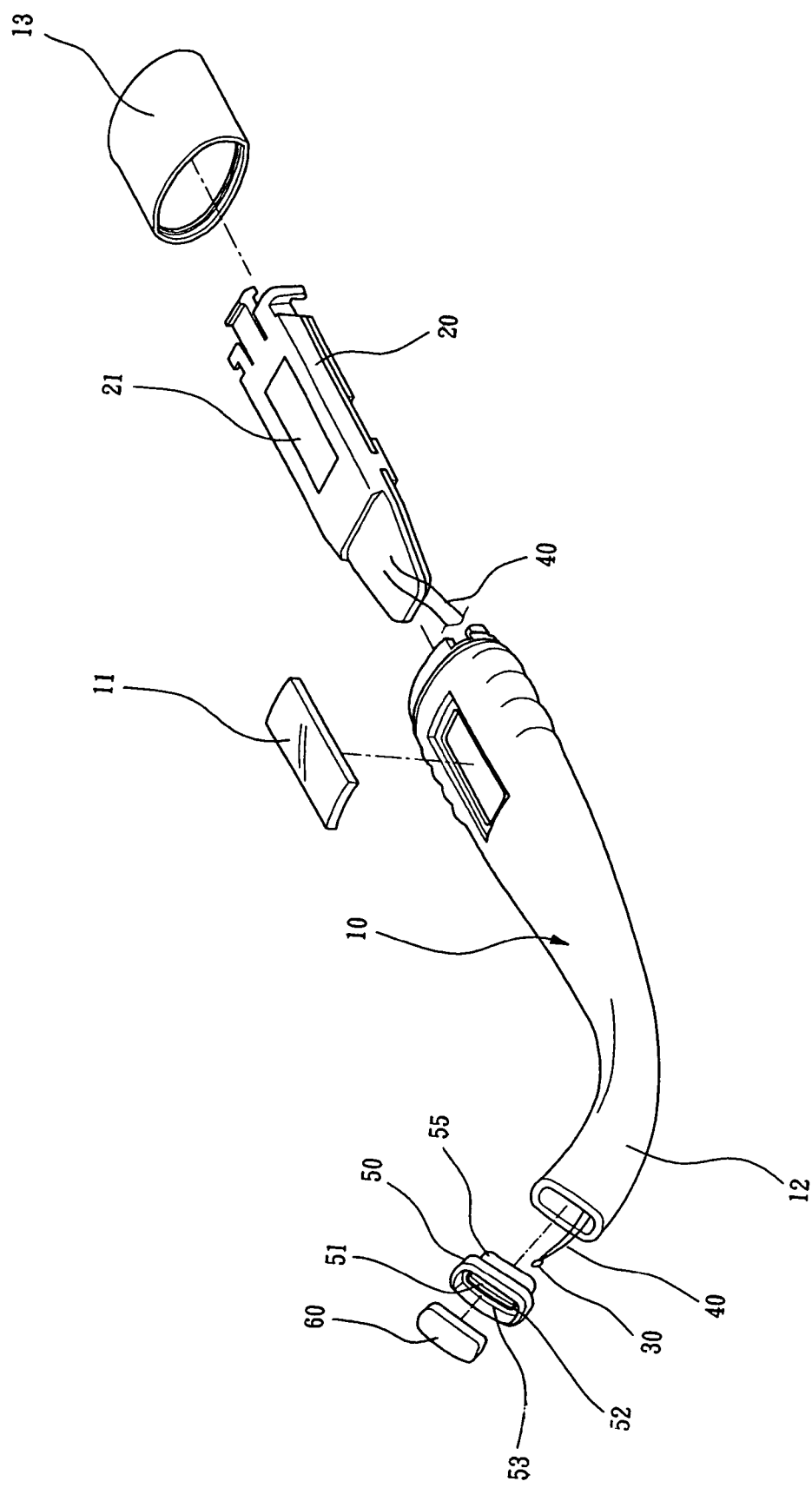
FIG. 2 is an exploded view of the present invention.
Figure 3:
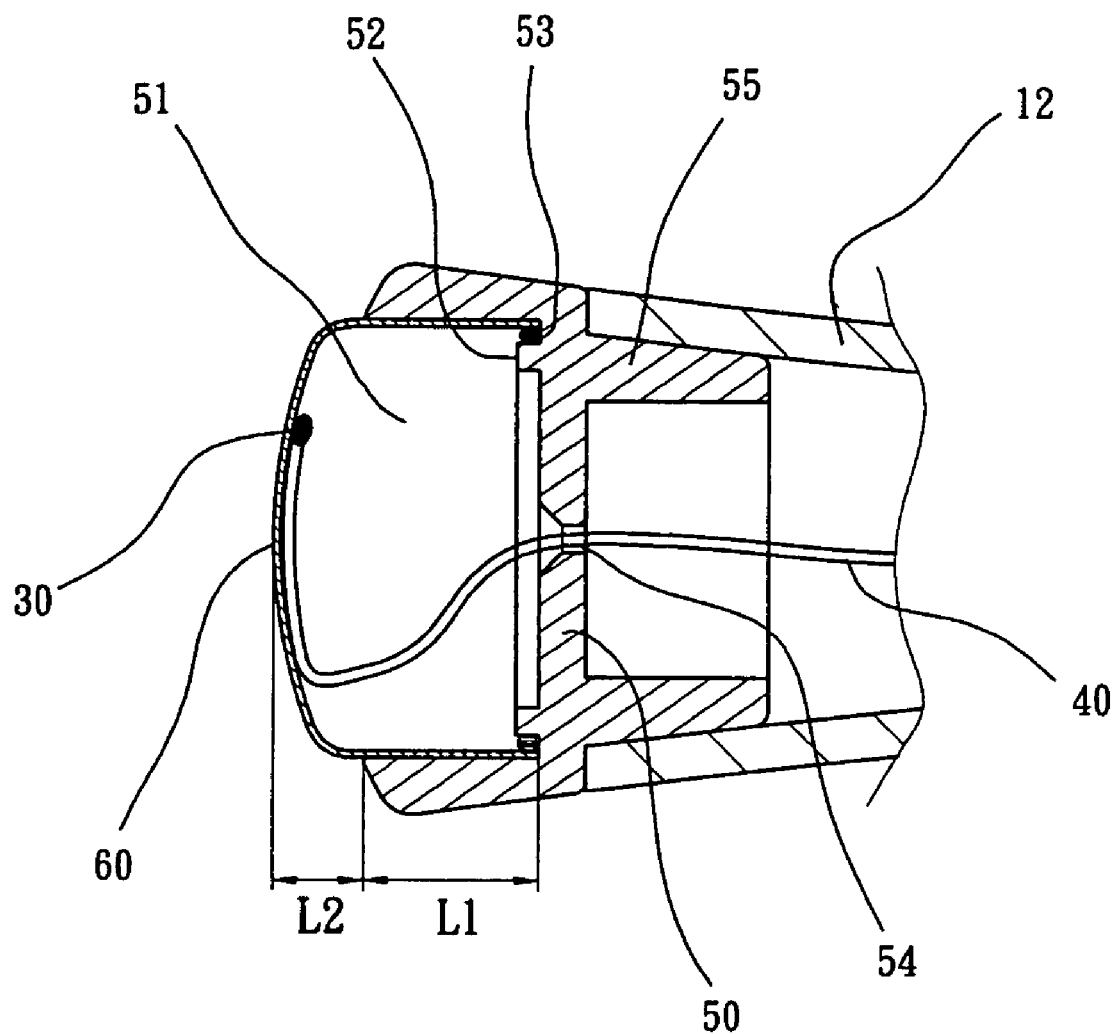
FIG. 3 is a sectional view of the assembly of the conducting structure and measuring end according to the present invention.

Referring to FIGS. 1, 2 and 3, the conducting structure according to the present invention is applied to an electronic clinical thermometer which comprises a body 10, a core 20, a temperature sensor 30 and conducting wires 40.

The body 10 is provided with a window 11 on the top side for viewing the temperature reading shown in the display 21. The body 10 is provided with a measuring end 12 provided with a conducting structure at an end and a detachable and waterproof cap 13 at the other end.

The core 20 is fitted within the body 10 and provided with necessary sensing circuit and electronic components and a display 21 for showing temperature readings.

The conducting wires 40 are electrically connected at one end with the temperature sensor 30 and the core 20 at the other end for transmitting the signal picked up by the temperature sensor 30 to the core so as to calculate the accurate temperature.

The conducting structure comprises a supporting member 50 and a contact member 60.

The supporting member 50 has an outer portion and an inner portion. The outer portion of the supporting member 50 has a recess 51 provided with an inner circumferential edge 52 thereby forming a groove 53 between the inner wall of the recess 51 and the outer wall of the inner circumferential edge 52. The supporting member 50 has a through hole 54 at the center for the passage of the conducting wires 40. The inner portion of the supporting member 50 has a neck 55 configured to be snugly fitted into the measuring end 12.

The contact member 60 is made of metallic conducting material and shaped as a cover with a curved outer top adapted to be in smooth contact with the human skin. The contact member 60 is embedded in groove 53 of the supporting member 50 and kept in place by adhesive so that a predetermined portion of the contact member 60 is fitted in the recess 51 of the supporting member 50. Hence, the contact member 60 has a large sensing contact surface, but only has a small portion protruded out of the supporting member 50. The preferred proportion of the exposed area of the contact member 60 and the engaging area of the contact member 60 with the supporting member 50 should not be less than 2:3. The preferred proportion of the avenge length L1 of the contact member 60 embedded into the supporting member 50 and average length L2 of the exposed portion of the contact member 60 should not be less than 3:2. The temperature sensor 30 and a portion of the conducting wires 40 are in close contact with the inner top surface of the contact member 60 so as to effectively conduct the heat produced by a human body to the temperature sensor 30. The temperature sensor 30 may be adhered to the inner top surface of the contact member 60 by a small amount of gel with a high conductive coefficient, a metal sheet with adhesive agent, or a filler with a low conductive coefficient such as foamed plastic.

Since the contact member 60 has a large temperature sensing area, it can be in full contact with the skin of a human portion such as the armpit thereby achieving the heat balance rapidly. Furthermore, the length of the contact member 60 embedded into the supporting member 50 is greater than the length of the exposed portion of the contact member 60 thereby reinforcing the structure and preventing the contact member 60 from breaking.

Figure 4:
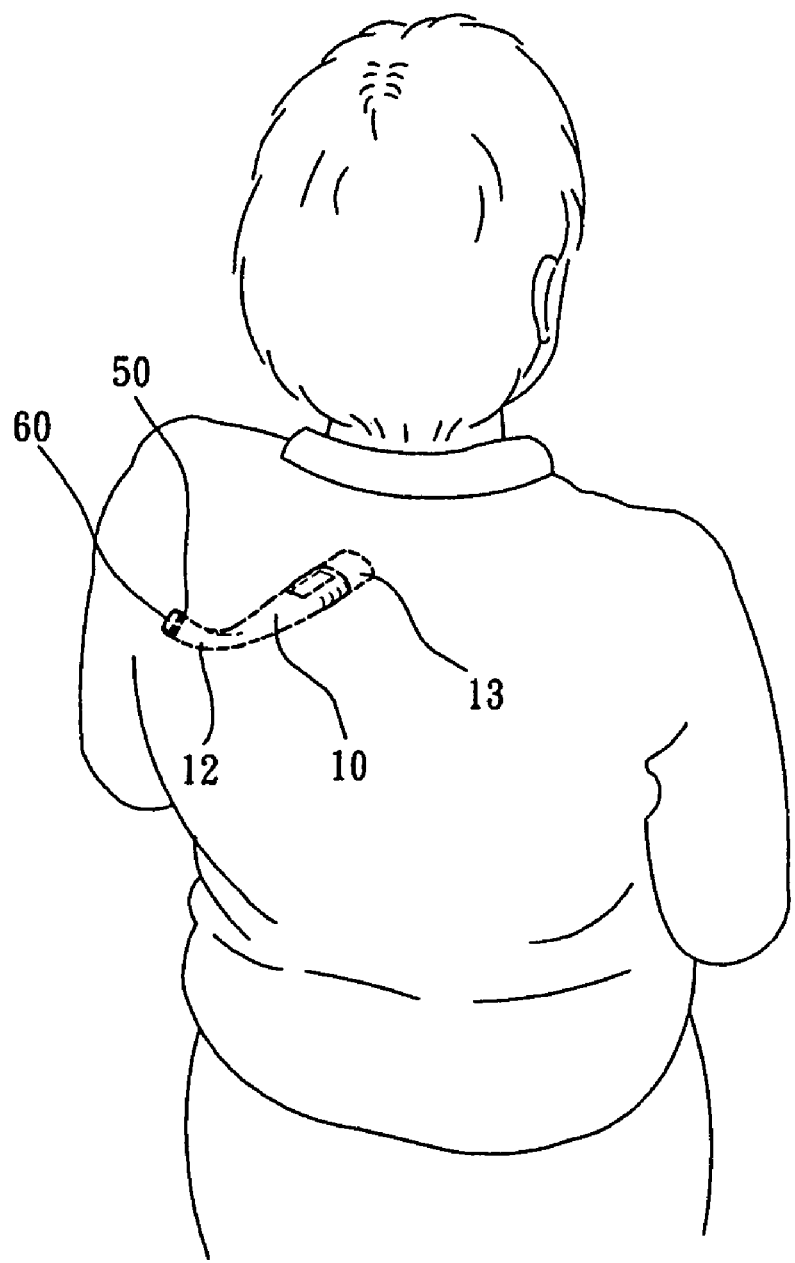
FIG. 4 is a working view of the present invention.

Referring to FIG. 4, the measuring end 12 of the body 10 of the electronic clinical thermometer with the conducting structure according to the present invention may be bent at a predetermined angle so that it can be held easily and comfortably to facilitate the operation of making the contact member 60 fully get in touch with the skin of a person.

Figure 5:
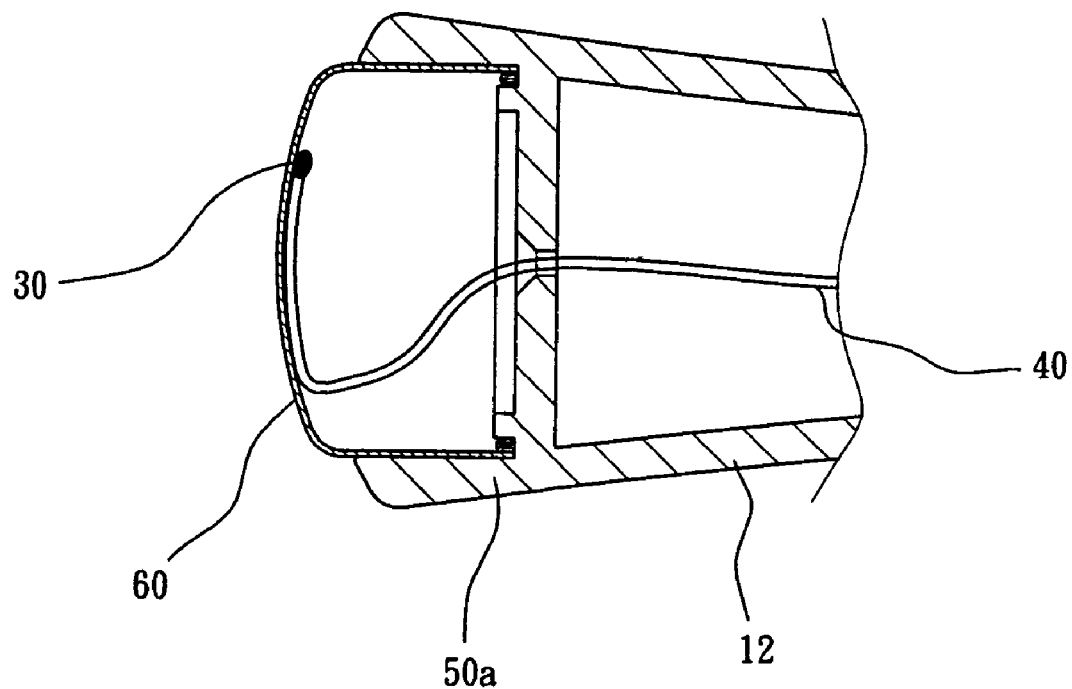
FIG. 5 is a sectional view of the assembly of the conducting structure and measuring end according to a second preferred embodiment of the present invention.

FIG. 5 illustrates a second preferred embodiment of the present invention. As shown, the supporting member 50a is integrally formed with the body 10.

Figure 6:
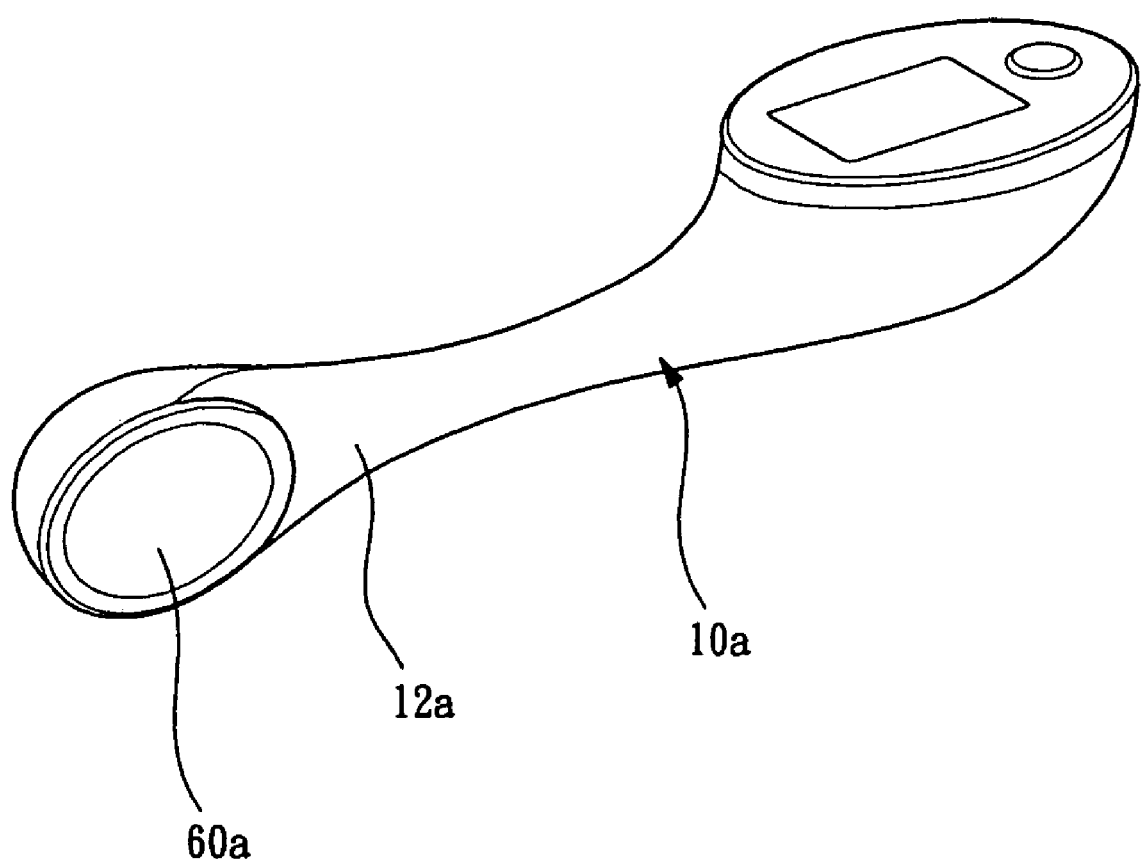
FIG. 6 illustrates a third preferred embodiment of the present invention.
Figure 7:
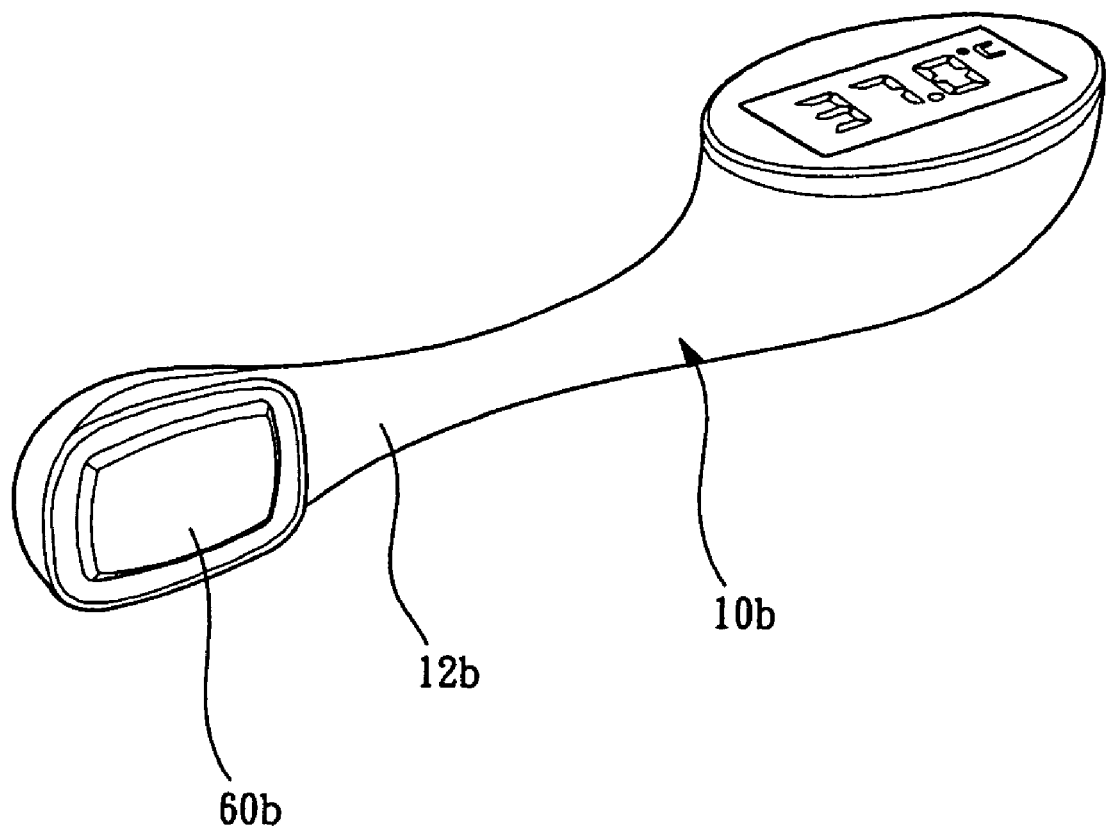
FIG. 7 illustrates a fourth preferred embodiment of the present invention.

FIGS. 6 and 7 illustrate the third and fourth preferred embodiments of the present invention. As can be seen, the measuring ends 12a and 12b of the bodies 10a and 10b are not bent at a predetermined angle and only have predetermined curves as required. The contact members 60a and 60b are provided to one side of the measuring ends 12a and 12b are provided to one side of the contact members 60a and 60b as required so as to achieve the effect of sensing and conducting in full contact. The contact member 60 may be elliptical or rectangular in shape.

Figure 8:
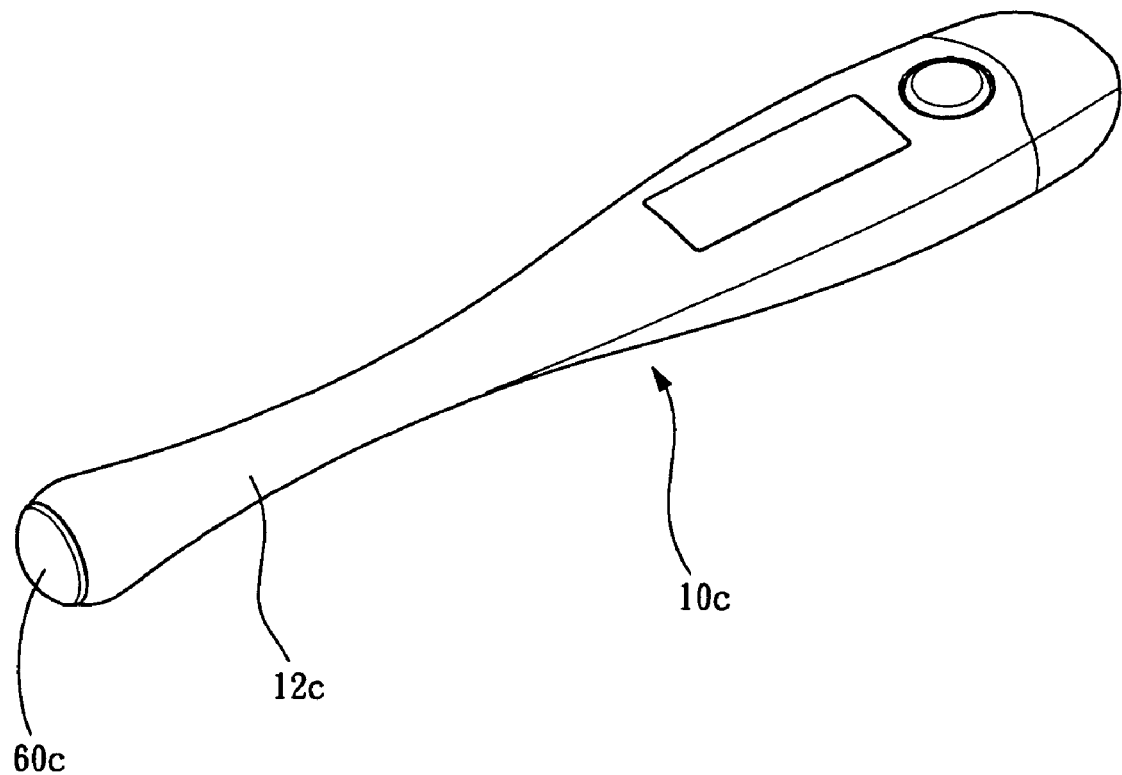
FIG. 8 illustrates a fifth preferred embodiment of the present invention.
Figure 9:
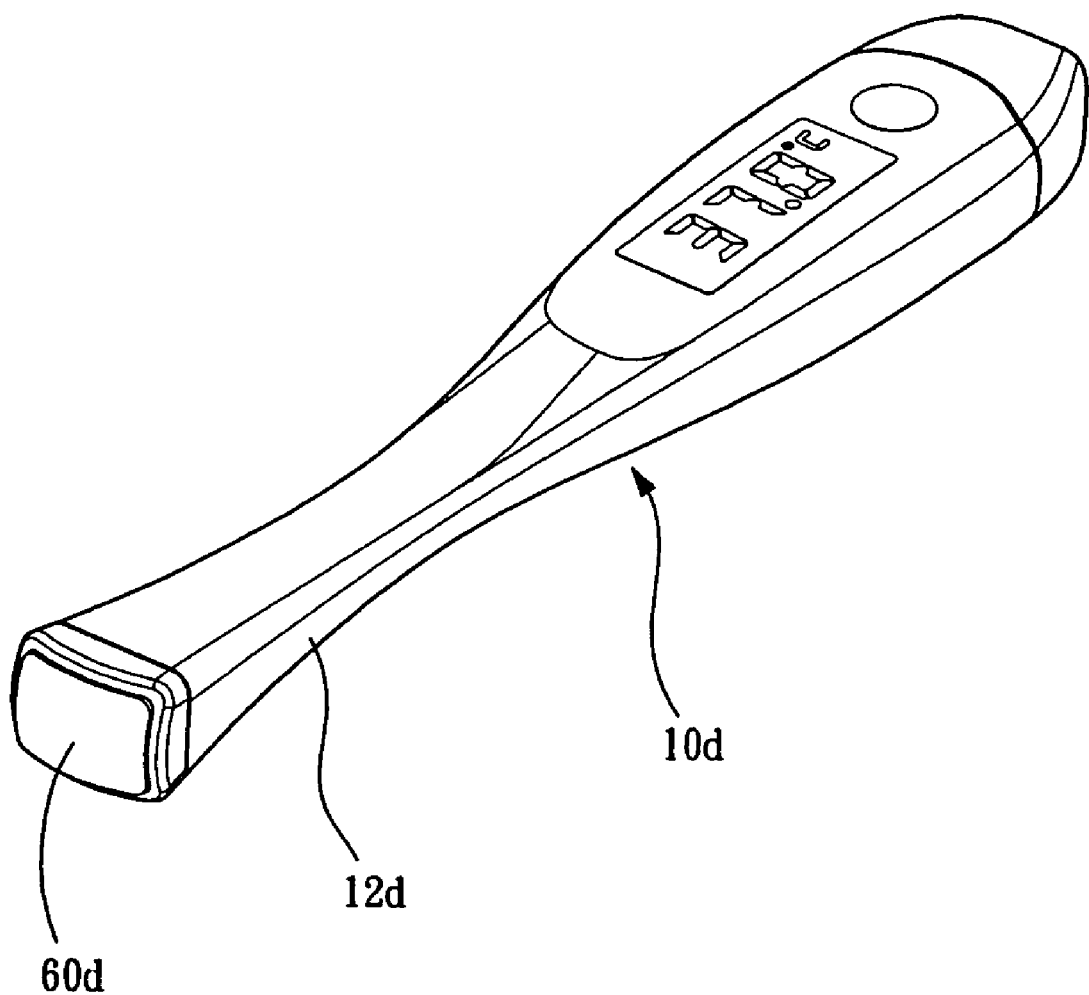
FIG. 9 illustrates a sixth preferred embodiment of the present invention.

FIGS. 8 and 9 illustrate the fifth and sixth preferred embodiment of the present invention. As shown, the bodies 10c and 10d may be of various kinds of shapes, and the contact members 60c and 60d are provided on the measuring ends 12c and 12d as required so as to achieve the effect of sensing and conducting in full contact. The contact members 60c and 60d are elliptical and rectangular in shape, respectively.

In conclusion, the contact member of the conducting structure according to the present invention is embedded in a recess formed on the measuring end of the electronic clinical thermometer and has the features of large contact area for sensing temperature and small exposed portion thereby achieving the effects of fully contacting the surface to be measured, preventing the contact member from breaking, providing a reinforced structure and rapid reaching heat balance. The measuring end of the electronic clinical thermometer embodying the conducting structure according to the present invention may be of a curved shape at a predetermined angle, or the contact member may be provided on either end of the measuring end as required so as to achieve the effect of sensing and conducting in full contact.

With the invention thus explained, it is apparent that various modifications and variations can be made without departing from the spirit of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A conducting structure of an electronic clinical thermometer, arranged on a measuring end of the electronic clinical thermometer, comprising:

said measuring end having a recess in which is fitted a temperature sensor and conductive wires;

a supporting member fitted within said measuring end and formed with a recess for receiving a contact member, said contact member having a curved top and made of metallic conductive material and having a predetermined length embedded in said recess of said supporting member with said curved top protruded out of said measuring end; and wherein said recess of said supporting member has an inner circumferential edge thereby forming a groove between said inner circumferential edge and an inner wall of said recess of said supporting member for engaging said contact member.

2. The conducting structure of an electronic clinical thermometer as claimed in claim 1, wherein a proportion of area of said curved top of said contact member to area of engaging area between said contact member and said measuring end is not less than 2:3.

3. The conducting structure of an electronic clinical thermometer as claimed in claim 1, wherein a proportion of average length of said contact member embedded in said measuring end to average length of said contact member protruded out of said measuring end is not less than 3:2.

4. The conducting structure of an electronic clinical thermometer as claimed in claim 1, wherein said temperature sensor is in close contact with an inner top of said contact member.

5. The conducting structure of an electronic clinical thermometer as claimed in claim 1, wherein said conductive wires are in close contact with an inner top of said contact member.

6. The conducting structure of an electronic clinical thermometer as claimed in claim 1, wherein said supporting member has a through hole for passage of said conductive wires.

7. The conducting structure of an electronic clinical thermometer as claimed in claim 1, wherein said supporting member has an inner portion engaged with said measuring end.

* * * * *